United States Patent [19]

Lee, II

[11] 3,971,542
[45] July 27, 1976

[54] FLUID VALVE AND VALVE SYSTEM
[75] Inventor: Leighton Lee, II, Guilford, Conn.
[73] Assignee: The Lee Company, Westbrook, Conn.
[22] Filed: July 5, 1974
[21] Appl. No.: 485,789

[52] U.S. Cl. .............................. 251/58; 137/625.6; 251/30; 251/231; 251/368; 285/322; 285/334.2
[51] Int. Cl.² ........................................ F16K 31/12
[58] Field of Search ................ 74/470; 251/58, 213, 251/231, 333, 368, 30; 285/137 R, 322, 323, 334.2, 356; 137/625.6

[56] References Cited
UNITED STATES PATENTS

| | | | |
|---|---|---|---|
| 1,260,246 | 3/1918 | Point | 251/58 |
| 1,947,257 | 2/1934 | Fritz et al. | 251/368 |
| 2,390,134 | 12/1945 | Svirsky | 251/368 |
| 2,511,844 | 6/1950 | Grove | 251/58 |
| 2,529,534 | 11/1950 | Beerli | 285/334.2 |
| 2,733,941 | 2/1956 | Trevaskis | 285/334.2 |
| 2,770,441 | 11/1956 | Grove | 251/58 |
| 2,775,471 | 12/1956 | Douglass | 285/334.2 |
| 2,901,913 | 9/1959 | Lovegrove | 74/18.1 |
| 3,061,823 | 10/1962 | Crossley, Jr. | 74/18.1 |
| 3,311,354 | 3/1967 | Wilson | 74/18.1 |
| 3,829,061 | 8/1974 | Dayne et al. | 251/368 |

Primary Examiner—Martin P. Schwadron
Assistant Examiner—George L. Walton
Attorney, Agent, or Firm—Prutzman, Hayes, Kalb & Chilton

[57] ABSTRACT

A valve system with an electromagnetically operated pilot valve for pneumatically actuating an operating piston of a primary valve for accurately metering, controlling and/or dispensing fluid with the primary valve. The piston is connected for pivoting a valve member actuating rod enclosed within a flexible tubular projection of a Teflon valve body via a rocker arm engageable with a free end of the tubular projection. Connectors for inlet and outlet Teflon conduits to the Teflon valve body have hard plastic inserts mounted within inlet and outlet passageways of the valve body between conforming sealing surfaces of the valve body and conduits.

14 Claims, 3 Drawing Figures

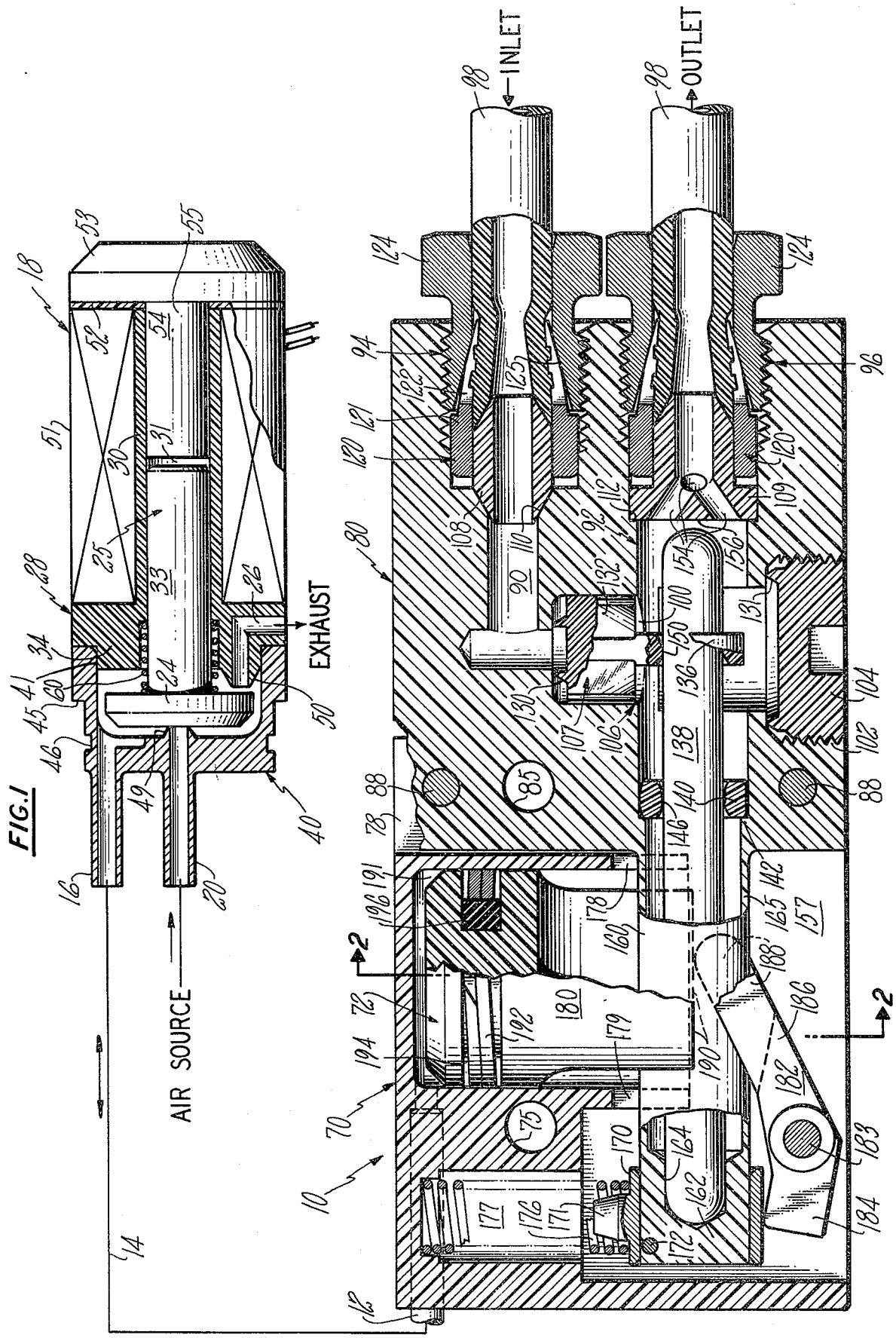

FLUID VALVE AND VALVE SYSTEM

BRIEF SUMMARY OF THE INVENTION

The present invention relates to valves and valve systems for controlling, metering and/or dispensing fluids.

It is a principal aim of the present invention to provide a new and improved multiple purpose valve useful with practically any fluid including corrosive and other chemically active fluids and employing a new and improved design for preventing fluid contamination and/or leakage.

It is another aim of the present invention to provide a new and improved valve operating mechanism which prevents fluid contamination and/or leakage without the use of fluid seals for any moving parts of the valve operating mechanism.

It is a further aim of the present invention to provide a new and improved fluid valve design with fluid connectors employing a new and improved sealing technique.

It is another aim of the present invention to provide a new and improved valve and valve system for accurately metering volumetric amounts of fluid for medicinal or other sensitive chemical applications.

It is a further aim of the present invention to provide a new and improved fluid valve design which permits construction of the valve in a miniature form for zero-defect and other highly demanding and sensitive applications.

It is another aim of the present invention to provide a new and improved valve system for electromagnetically metering, controlling and/or dispensing a fluid. In accordance with the present invention, a new and improved electromagnetically operated pilot valve is employed for pneumatically controlling a primary valve for accurately metering, controlling and/or dispensing fluid as desired.

It is another aim of the present invention to provide a new and improved electromagnetically operated valve having an economical and efficient design permitting electromagnetic valve operation with minimum power.

It is a further aim of the present invention to provide a new and improved pneumatically operated valve which can be selectively operated for accurately metering even very small amounts of fluid.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 1 is a partly schematic, partly section view, partly broken away and partly in section, of a valve system incorporating an embodiment of the present invention;

DESCRIPTION OF THE PREFERRED EMBODIMENT

Figure 3:
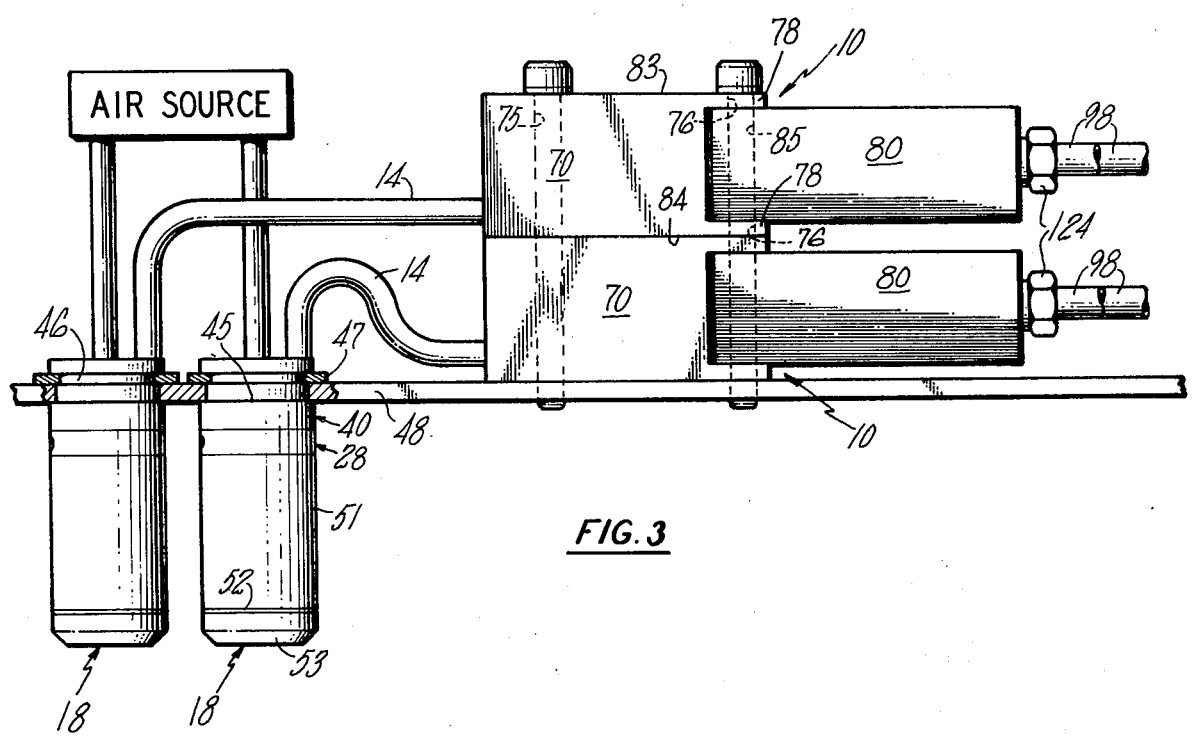
FIG. 3 is a reduced side view, partly broken away and partly in section, of a pair of the valve systems.
Figure 2:
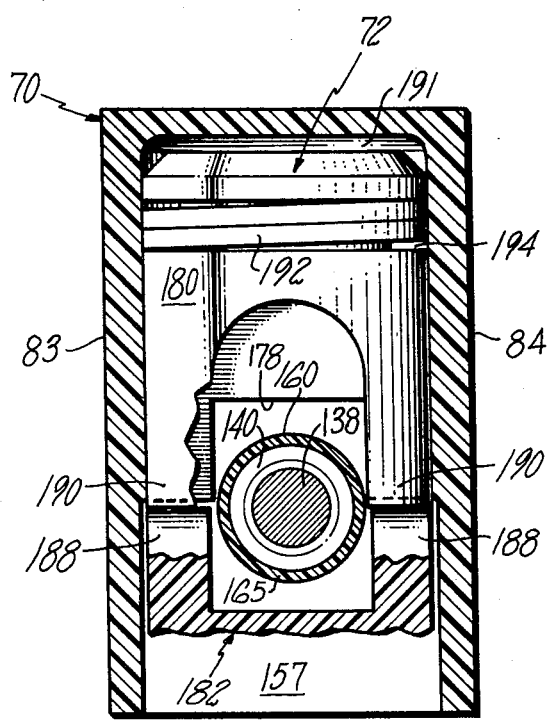
FIG. 2 is a transverse section view, partly broken away and partly in section, taken substantially along line 2—2 of FIG. 1.

Referring now to the drawings in detail wherein like numerals designate like parts, a valve system incorporating an embodiment of the present invention is shown comprising a pneumatically operated primary valve 10 having a control conduit 12 connected via a suitable tube 14 to a control conduit 6 of a electromagnetically operated auxiliary or pilot valve 18. An inlet conduit 20 of the pilot valve 18 is adapted to be connected to a suitable air pressure source, and a valve member 24 of a pilot valve armature 25 is adapted to be shifted between a closed position shown in the drawing where the pilot valve inlet conduit is closed by the valve member 24 and the primary valve control conduit 12 is connected to an L-shaped pilot valve exhaust conduit 26, and an open position where the pilot valve exhaust conduit 26 is closed by the valve member 24 and the pressure source is connected via the pilot valve member 24 and the pressure source is connected via the pilot valve inlet and control conduits to the primary valve 10.

The pilot valve 18 has a generally elongated cylindrical shape and is formed of seven parts which include a molded plastic spool 28 having a central cylindrical hub 30 with a coaxial cylindrical opening 31 for slideably supporting a reduced rod portion 33 of the armature 25 and an enlarged coaxial circular inner end wall 34 formed with the L-shaped exhaust conduit 26. A molded end piece 40 is suitably secured onto a reduced cylindrical end 41 of the spool end wall 34 to defined a valve operating chamber therebetween. The molded end piece is formed with the axially extending control and inlet conduits 16, 20 respectively, and is also formed with a mounting shoulder 45 and an annulus 46 for receiving a suitable retaining ring 47 for facilitating mounting the pilot valve, for example, within an opening of a suitable support plate 48 as shown in FIG. 3. The valve inlet conduit 20 is formed coaxially with the spool 28 and armature 25 and with an axially inwardly projecting tapered annular valve seat 49 engageable by the valve member 24 to close the axially inwardly opening port of the inlet conduit 20. The spool end wall 34 is similarly formed with an axially inwardly projecting tapered annular valve seat 50 engageable by the valve member 24 for closing the axially outwardly opening port of the exhaust conduit 26. The pilot valve control and exhaust conduits 16, 26 are diametrically offset from each other and radially offset from the valve axis.

The opposed inlet and exhaust valve seats 49, 50 have an axial spacing slightly greater than the axial thickness of the valve member 24 so that the armature 25 can be quickly shifted between its open and closed positions. A suitable coil 51 is mounted on the spool hub 30 and is secured thereon by a plastic end washer 52 and an enlarged end cap 53 of a core piece 54. The core piece 54 has a coaxial reduced cylindrical portion 55 securely mounted within the spool cylinder in axial alignment with the armature 25. With the armature 25 in its closed position shown, the axial air gap between the opposed parallel end faces of the core 54 and armature 25 is slightly greater than the axial displacement of the armature 25 between its open and closed positions and so that the inner end face of the armature 25 is close to but doesn't contact the inner end face of the core 54 with the armature 25 in its open position.

A return compression coil spring 60 encircling the armature 25 is employed for holding the valve in its closed position in engagement with the valve seat 49 against the fluid inlet pressure when the coil 51 is de-energized. The pilot valve 18 is primarily designed for use with low air pressure (e.g. 10 psi) and so that a light return spring 60 can be used for holding the valve closed. When the coil 51 is energized, the armature 25 is thereupon magnetically withdrawn to open the inlet conduit 20 and close the exhaust or outlet conduit 26. The entire core 54 including the enlarged end cap 56 and the entire armature 25 including the enlarged valve member 24 are made of low reluctance ferromagnetic material such as soft iron. Accordingly, the end cap 56 and valve member 24 provide low reluctance magnetic field return path segments externally of the coil 51 for increasing the coil efficiency.

The valve 10 has a two-piece elongated body with a first relatively hard housing part 70, preferably molded of a suitable hard plastic, for a valve operating mechanism 72, and a second chemically inert relatively soft valve body part 80 preferably molded of Teflon (i.e. polytetrafluoroethylene). The housing part 70 has a generally box-like external configuration with opposed parallel faces 83, 84 permitting the valves 10 to be stacked together as shown in FIG. 3. For that purpose, the housing part 70 is formed with a pair of openings 75, 76 (and the valve body part 80 is formed with an opening 85 aligned with the opening 76) for securing a stack of the valves 10 together and/or to a suitable support with suitable able fasteners extending through the openings 75, 76, 85. The housing part 70 has an inner bifurcated end with parallel flanges 78 for receiving the inner end of the valve body part 80, and the two parts 70, 80 are rigidly secured together by suitable fasteners such as rivets 88 extending through aligned openings in the spaced flanges 78 and valve body part 80.

The valve body part 80 is formed with a pair of laterally spaced longitudinally extending internal passageways 90, 92 with enlarged threaded outer openings for connecting the passageways with connectors 94, 96 respectively to suitable chemically inert relatively soft plastic conduits or tubing 98 preferably made of Teflon (i.e. polytetrafluoroethylene). A transversely extending passageway or bore 100 is formed in the valve body 80 for interconnecting the parallel passageways 90, 92. The passageway 100 has an enlarged threaded outer opening 102 for receiving a suitable molded plastic plug 104 and forms a valve chamber 106 intermediate the passageways 90, 92 for receiving a molded plastic valve member 107. The plug 104 and valve member 107 are formed of a suitable chemically inert and hard plastic material.

The connectors 94, 96 respectively comprise a male ferrule insert 108 and a male adapter insert 109 which are mounted in the passageways 90, 92 in sealing engagement with a conforming tapered seat 110 and a conforming locating shoulder or seat 112 of the valve body part 80. The inserts 108, 109 are also molded of a suitable chemically inert and hard plastic material. Since the valve body part 80 is molded of relatively soft plastic (preferably Teflon), the relatively hard plastic parts 104, 107, 108 and 109 are adapted to coact therewith to provide an effective leakproof seal. Also, the valve member 107 and plug 104 are formed with tapered annular projections 130, 131 respectively engageable with coacting annular planar faces of the relatively soft valve body part 80 to provide an effective fluid seal. Similarly, the ferrule insert 108 and adapter insert 109 have outer tapered male ends for engaging conforming tapered ends of the tubing 98 to provide a good seal between the relatively hard plastic inserts and the relatively soft Teflon tubing 98.

A collet sleeve 120 having an inner collar 121 and four outer axially extending equiangularly spaced gripping segments or fingers 122 is mounted over each insert 108, 109, and a suitable gland nut 124 having a relatively steep inwardly tapered annular camming face 125 (e.g., at an angle of 30° to the axis of the nut) is threaded into the valve body 80 to lock the connector parts in place and provide a leakproof seal using the relatively hard plastic inserts, 108, 109 as an intermediate sealing part between the relatively soft plastic body part 80 and tubing 98. The fingers 122 are thereby cammed radially inwardly as shown, and the inner surfaces of the fingers 122 are formed with transverse grooves to firmly grip the tubing 98 and thereby lock the connector parts in place. Accordingly, the connectors 94, 96 provide chemically inert transitional passageways from the tubing 98 to the internal valve body passageways 90, 92.

The valve member 107 is molded with suitable axially extending peripheral slots 132 to provide a fluid connection between the parallel passageways 90, 92 when the valve member 107 is withdrawn from engagement with its valve seat. The valve member 107 is molded with an integral circular stem or collar 136 for receiving an elongated generally cylindrical valve operating lever or rod 138 mounted within the passageway 92. A lever pivot ring 140 similar to the collar 136 is press fit within the passageway 92 in engagement with a locating shoulder 142 to provide a circular pivot or fulcrum for the lever 138. The pivot ring 140 is formed of a suitable hard and chemically insert plastic (as is the collar 136 which is formed integrally with the valve member 107). The elongated rod 138 is formed of a suitable rigid and chemically inert material, preferably a suitable ceramic material.

The collar 136 and pivot ring 140 are generally coaxially aligned within the elongated passageway 92 and such that the rod 138 is mounted generally centrally within the passageway 92 with the valve member 107 in its closed position shown. The OD of the cylindrical rod 138 and the ID of the pivot ring 140 and collar 136 are preferably substantially equal so that the pivot rod 138 can be pivoted about the internal circular edge 146 of the ring 140 to shift the valve member between its closed position shown and a slightly withdrawn open position without interference or play between the parts. Also, the internal edge 146 of the ring 140 and the internal edge 150 of the collar 136 are chamfered or tapered to provide a central cylindrical supporting edge having a sufficient axial dimension to provide adequate bearing support for the rod 138.

The rod 138 is mounted in axial alignment with the hard plastic insert 109 of the connector 96, and the insert 109 is designed to provide an end stop for limiting outward axial movement of the rod 138, to the right as seen in FIG. 1. The axial passageway formed in the insert 109 has four equiangularly spaced inclined ports 154 at the inner end of the insert 109 for facilitating conducting fluid around the pivot rod 138 to provide a central limit stop 156 for the rod 138.

The rod 138 extends inwardly into a slot or chamber 157 of the housing part 70 beyond the main generally box-like portion of the valve body part 80, and the valve body part 80 is formed with an imperforate elongated tubular extension 160 for completely enclosing the rod extension. The tubular extension 160 has a relatively thin flexible tubular wall 165 and a relatively thick end wall 162 formed with a pocket 164 for snugly receiving the adjacent end of the rod 138 and is integrally molded with the rest of the valve body part 80 whereby the tubular extension 160 and rod 138 can be pivoted together to shift the valve member 107 between its open and closed positions.

A collar 170 having an integral spring guide 171 is secured to the end of the tubular projection 160 as by a transverse pin 172, and a compression coil spring 176 is mounted within a pocket 177 of the housing part 70 in engagement with the collar 170. The compression spring functions to pivotally bias the flexible tubular extension 160 and the enclosed rigid rod 138 to close the valve. The housing part 70 is formed with a pair of aligned slots 178, 179 for receiving the tubular extension 160 and having guide edges for guiding the pivotal movement of the tubular extension 160 in the plane of the axes of the rod 138 and valve member 107.

The tubular extension 160 and rod 138 are preferably sufficiently long so that the spring force is amplified preferably by a factor of two or more to permit a relatively light compression spring 176 to be employed for quickly closing the valve. Also, he longitudinal passageways 90, 92 may be selectively used as the valve inlet and outlet as desired to provide for closing the valve against an inlet and outlet fluid pressure differential or for using the pressure differential to assist in biasing and holding the valve closed. The compression spring force and spring rate is selected in accordance with the particular application and the selected use of the passageways 90, 92 as the valve inlet and outlet.

The combination flexible tube 160 and enclosed rigid rod 138 are adapted to be pivoted against the bias of the return spring 176 by a pneumatically actuated mechanism comprising a piston 180 and a piston operated lever or rocker arm 182. The rocker arm 182 is mounted on a pivot pin 183 extending between the sides of the housing part 70 and has a relatively short lever arm 184 engageable with the collar 170 and a relatively long lever arm 186 with a bifurcated end 188 receiving the tubular extension 160 and engaging an inner bifurcated skirt 190 of the piston 180. Consequently, the piston 180 and rocker arm 182 straddle the tubular extension 160 between the guide slots 178, 179 to permit the piston to pivot the rocker arm 182 against the bias of the return spring 176 (and any fluid pressure differential biasing the valve member 107 closed) for opening the valve. Also, amplification of the piston force, for example, by a factor of two or more is provided by the rocker arm 182 to facilitate rapidly opening the valve.

The piston 180 is mounted within a suitable cylinder or bore 191 in the housing part 70, and the cylinder 191 is connected to the fluid control conduit 12 so that the piston 180 can be selectively actuated with th pilot valve 18 to open and close the valve 10. A two-coil helical piston ring 192 of Teflon is mounted within an annulus 194 of the piston 180 and a resilient annular expansion ring 196 of soft neoprene is mounted in the annulus 194 within the piston ring 192 to bias the piston ring outwardly to maintain proper sealing engagement with the cylinder wall.

It can be seen that the pilot valve 18 can be electrically operated and controlled to quickly open and close the primary valve 10 for accurately metering the amount of fluid flowing from the valve inlet to the valve outlet. The primary valve 10 may be used with substantially any fluid for metering, controlling and/or dispensing that fluid as desired, it being seen that all surfaces of the primary valve 10 which are contacted or wetted by the controlled fluid are chemically inert. Also, all of the fluid seals are provided by the coaction of relatively hard plastic sealing surfaces with relatively soft sealing surfaces of the Teflon valve body 80 and Teflon tubing 98. The single piece molded Teflon valve body part 80 provides the required flexure for the flexible tubular projection 160 and provides an appropriate seat or sealing surface of the hard plastic valve 107, plug 104 and inserts 108, 109 of the valve connectors 94, 96. Therefore, the valve material and valve design employed collectively produce an effective valve for handling chemically active fluids. The integral valve body enclosure 160 for the actuating rod 138 provides for mechanically operating the internal valve member 107 with an external mechanical operating mechanism without the usual movable part sealing requirements and so as to completely eliminate any possible fluid leakage and fluid contamination. The valve design also permits miniaturization of the valve and system, and the primary valve 10 in miniature form (e.g., having a body less than 1¾ inches long) is operable for accurately metering fluids under pressure up to 100 psi and for selective operation by a miniaturized pilot valve operated from a 12 volt DC power source.

As will be apparent to persons skilled in the art, various modifications, adaptations and variations of the foregoing specific disclosure can be made without departing from the teachings of the present invention.

I claim:

1. In a valve comprising a valve body with passageway means therein including fluid passageway means with a valve operating chamber, a valve member shiftable within the valve operating chamber for controlling the flow through the fluid passageway means, and valve operating means for shifting the valve member for controlling the fluid flow through the fluid passageway means, the improvement wherein the valve operating means comprises a valve member operating lever pivotally mounted within said valve body passageway means and having a lever arm at one end of the operating lever for pivoting the operating lever for shifting the valve member, wherein the valve body is a one-piece plastic valve body with an integrally formed imperforate enclosed tubular projection receiving the lever arm and forming therewith a lever combination, the tubular projection completely enclosing the lever arm within said plastic valve body passageway means and being flexible to permit pivoting the lever combination and thereby pivot the lever arm enclosed therein for shifting said valve member, and wherein the valve operating means further comprises means for pivoting the lever combination for shifting the valve member.

2. A valve according to claim 1 wherein the means for pivoting the lever combination comprises a pivotal rocker arm having one end engageable with said lever combination for pivoting the lever combination for shifting the valve member and a second end, and a reciprocably mounted fluid pressure actuated piston engageable with the second end of the rocker arm for pivoting the rocker arm.

3. A valve according to claim 1 wherein the valve body is made of a relatively soft plastic.

4. A valve according to claim 1 wherein the tubular projection has an outer end with a lever arm support recess, wherein the lever arm has an outer end snugly received within the support recess, and wherein the means for pivoting the lever combination engages the outer end of the tubular projection for pivoting the lever combination for shifting the valve member.

5. A valve according to claim 1 wherein said plastic valve body is made of Teflon.

6. A valve according to claim 5 wherein said Teflon valve body is formed with a Teflon valve seat for the valve member, and wherein the valve member has a sealing edge of material harder than the Teflon valve seat and engageable therewith for sealing the fluid passageway means with the valve member.

7. A valve according to claim 5 further comprising at least one separate fluid conduit of Teflon and a respective fluid connector for connecting the Teflon fluid conduit to the fluid passageway means of the Teflon valve body, said respective fluid connector comprising an insert mounted within said fluid passageway means and having an axial transitional flow passageway therethrough, an inner axial end of the connector insert and the Teflon valve body having conforming abutting sealing edges and the outer axial end of the connector insert and the Teflon conduit having conforming abutting sealing edges, the connector insert being made of a material harder than the Teflon valve body and Teflon conduit, and retaining means for holding the relatively hard insert in sealing engagement between the conforming sealing edges of the Teflon valve body and Teflon fluid conduit.

8. A valve according to claim 7 wherein the valve comprises two of said separate fluid conduits of Teflon and respective fluid connectors 9. A valve according to claim 1 wherein the valve further comprises a valve housing affixed to said plastic valve body with said tubular projection extending therein, and wherein the means for pivoting the lever combination comprises lever operating means mounted within the housing for selectively pivoting the lever combination.

10. A valve according to claim 9 wherein said plastic valve body is made of a first relatively soft plastic and the valve housing is made of a second relatively hard plastic.

11. A valve according to claim 10 wherein said plastic valve body is made of Teflon.

12. In a valve comprising a valve body with fluid passageway means therein with a valve operating chamber and an annular valve seat at one end of the valve operating chamber, a valve member axially shiftable within the valve operating chamber in opposite axial directions into and out of sealing engagement with the annular valve seat for controlling the flow through the fluid passageway means, valve operating means for axially shifting the valve member into and out of engagement with the annular valve seat for controlling the fluid flow through the passageway means, at least one separate fluid conduit to the valve body, and a respective fluid connector therefor for connecting the fluid conduit to the fluid passageway means of the valve body, the improvement wherein the valve body and fluid conduit are made of Teflon and the Teflon valve body is a one-piece Teflon valve body, wherein the connector comprises an insert mounted within the valve body passageway means and having an axially extending transitional flow passageway therethrough, the inner axial end of the connector insert and the Teflon valve body having conforming abutting sealing edges and the outer axial end of the connector insert and the Teflon conduit having conforming abutting sealing edges, the connector insert being made of a chemically inert plastic material harder than the Teflon valve body and Teflon conduit, and retaining means for holding the relatively hard plastic connector insert in sealing engagement with the conforming sealing edges of the Teflon valve body and Teflon fluid conduit, and wherein the valve member is made of a chemically inert plastic material harder than the Teflon valve body and the valve body is integrally formed with the annular valve seat to provide a relatively soft valve seat for the harder valve member for sealing the fluid passageway means.

13. In a valve comprising a valve body with passageway means therein including fluid passageway means with a valve operating chamber, a valve member shiftable within the valve operating chamber for controlling the flow through the fluid passageway means, valve operating means for shifting the valve member for controlling the fluid flow through the fluid passageway means, the improvement wherein the valve operating means comprises a valve member operating lever pivotally mounted within said valve body passageway means and having a lever arm at one end of the operating lever for pivoting the operating lever for shifting the valve member, wherein the valve body comprises an integral imperforate enclosed tubular projection receiving the lever arm and forming therewith a lever combination, the tubular projection completely enclosing the lever arm within said valve body passageway means and being flexible to permit pivoting the lever combination and thereby pivot the lever arm enclosed therein for shifting said valve member, wherein the valve operating means further comprises motor means for pivoting the lever combination for shifting the valve member, and wherein the motor means comprises a rocker arm pivotally mounted alongside said lever combination and having an outer end engageable therewith for pivoting the lever combination for shifting the valve member and an inner bifurcated end straddling the lever combination, and a fluid pressure actuated piston mounted for reciprocable movement and engageable with the bifurcated end of the rocker arm for pivoting the lever combination.

14. In a valve comprising a valve body with passageway means therein including fluid passageway means with a valve operating chamber, a valve member shiftable within the valve operating chamber for controlling the flow through the fluid passageway means, valve operating means for shifting the valve member for controlling the fluid flow through the fluid passageway means, the improvement wherein the valve operating means comprises a valve member operating lever pivotally mounted within said valve body passageway means and having a lever arm at one end of the operating lever for pivoting the operating lever for shifting the valve member, wherein the valve body comprises an integral imperforate enclosed tubular projection receiving the lever arm and forming therewith a lever combination, the tubular projection completely enclosing the lever arm within said valve body passageway means and being flexible to permit pivoting the lever combination and thereby pivot the lever arm enclosed therein for shifting said valve member, wherein the valve member has a stem with a first collar receiving the valve operating lever for shifting the valve member with the valve operating lever, wherein the valve comprises a second collar mounted within said valve body passageway means and receiving the valve operating lever to provide a fulcrum therefor, and wherein the valve operating means further comprises means for providing the lever combination for shifting the valve member.

* * * * *

UNITED STATES PATENT OFFICE
CERTIFICATE OF CORRECTION

PATENT NO. : 3,971,542
DATED : July 27, 1976
INVENTOR(S) : Leighton Lee II

It is certified that error appears in the above-identified patent and that said Letters Patent are hereby corrected as shown below:

Column 2, line 9, delete "6" and insert --16--. Same line, after "of", delete "a" and insert --an--.

Column 2, lines 20-22, delete "member 24 and the pressure source is connected via the pilot valve".

Column 2, line 32, delete "defined" and insert --define--.

Column 3, line 31, delete "able".

Column 4, line 65, after "138" insert --and--.

Column 5, line 28, delete "he" and insert --the--.

Column 5, line 61, delete "th" and insert --the--.

Column 9, line 4, after "lever," insert --and--.

Column 10, line 3, delete "providing" and insert -- pivoting --.

Signed and Sealed this

Twenty-eighth Day of December 1976

[SEAL]

Attest:

RUTH C. MASON
*Attesting Officer*

C. MARSHALL DANN
*Commissioner of Patents and Trademarks*